United States Patent
Sheridan

(10) Patent No.: US 10,379,993 B2
(45) Date of Patent: *Aug. 13, 2019

(54) TECHNIQUES FOR TRAVERSING REPRESENTATIONS OF SOURCE CODE

(71) Applicant: WHITEHAT SECURITY, INC., Santa Clara, CA (US)

(72) Inventor: Eric Sheridan, Summerfield, NC (US)

(73) Assignee: WHITEHAT SECURITY, INC., Santa Clara, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/405,045

(22) Filed: Jan. 12, 2017

(65) Prior Publication Data
US 2017/0351596 A1    Dec. 7, 2017

Related U.S. Application Data

(63) Continuation of application No. 13/830,510, filed on Mar. 14, 2013, now Pat. No. 9,569,334.

(51) Int. Cl.
*G06F 9/44* (2018.01)
*G06F 11/36* (2006.01)

(52) U.S. Cl.
CPC ................ *G06F 11/3604* (2013.01)

(58) Field of Classification Search
CPC .......... G06F 8/74; G06F 8/75; G06F 11/3604
See application file for complete search history.

(56) References Cited

U.S. PATENT DOCUMENTS

| | | | |
|---|---|---|---|
| 5,768,480 A | 6/1998 | Crawford, Jr. et al. | |
| 5,870,590 A | 2/1999 | Kita et al. | |
| 7,302,707 B1 | 11/2007 | Weber et al. | |
| 7,526,760 B1 | 4/2009 | Daynes et al. | |
| 2005/0166193 A1 | 7/2005 | Smith et al. | |
| 2010/0083240 A1 | 4/2010 | Siman | |
| 2010/0299659 A1 | 11/2010 | Kirshnaswamy et al. | |
| 2011/0239204 A1 | 9/2011 | Sukumaran | |
| 2011/0314458 A1 | 12/2011 | Zhu et al. | |
| 2012/0102474 A1 | 4/2012 | Artzi et al. | |
| 2012/0110551 A1 | 5/2012 | Fink et al. | |
| 2012/0192161 A1 | 7/2012 | Pistoia et al. | |
| 2012/0311533 A1 | 12/2012 | Fanning et al. | |
| 2012/0317647 A1 | 12/2012 | Brumley et al. | |
| 2013/0031531 A1 | 1/2013 | Keynes et al. | |

OTHER PUBLICATIONS

Extended European Search Report dated Oct. 27, 2016 in corresponding EP Application No. 14775834.6, filed Mar. 5, 2014, titled "Techniques for Traversing Representations of Source Code", 8 pages.

*Primary Examiner* — Duy Khuong T Nguyen
(74) *Attorney, Agent, or Firm* — Polsinelli PC

(57) ABSTRACT

Methods, apparatus, and systems for traversing a representation of an application source code, such as an abstract syntax tree (AST), are disclosed. Steps for traversing the AST include specifying a plurality of runtime binding rules which are associated with one or more locations within the AST, beginning to traverse the AST, monitoring a history of the traverse, continuing to traverse the AST based on the history of the traverse, and updating the history of the traverse. Continuing to traverse the AST may include identifying a plurality of concrete implementations of a method invocation and traversing less than all of the concrete implementations based at least in part on the runtime binding rules, the concrete implementations being traversed being selected based on the history of the traverse.

16 Claims, 12 Drawing Sheets

```
1   public class BankHttpServlet extends HttpServlet {
2
3       @Autowired
4       private IBankService bankService = null;
5
6       public void doPost(HttpServletRequest request, HttpServletResponse
        response) throws IOException, ServletException {
7           String account = request.getParameter("account");
8           Long amount = Long.valueOf(request.getParameter("amount"));
9
10          try {
11              bankService.transfer(account, amount);
12          } catch (Exception exception) {
13              LOGGER.log(Level.SEVERE, exception.getMessage(),
                    exception);
14          }
15      }
16
17  }
```

FIG. 6A

```
1  public abstract class AbstractBankService implements IBankService {
2
3      public abstract boolean isAuthorizedForAccount(User user, String
       account) throws Exception;
4
5      public abstract void performTransfer(String account, Long amount)
       throws Exception;
6
7      @Override
8      public void transfer(String account, Long amount) throws Exception {
9
10             if(isAuthorizedForAccount(ApplicationContext.getUser(),
       account)) {
11                 beginTransaction();
12
13                 try {
14                     performTransfer(account, amount);
15
16                     commitTransaction();
17                 } catch (Exception exception) {
18                     rollbackTransaction();
19
20                     throw exception;
21                 }
22             } else {
23                 LOGGER.severe("Attempt to Access Unauthorized Account
                   (account:" + account + ",user:" +
                   ApplicationContext.getUser() + ")");
24             }
25     }
26
27     public void beginTransaction() throws Exception {
28         // stubbed out hook
29     }
30
31     public void commitTransaction() throws Exception {
32         // stubbed out hook
33     }
34
35     public void rollbackTransaction() throws Exception {
36         // stubbed out hook
37     }
38
39 }
```

FIG. 6B

```
1  public class DatabaseBankService extends AbstractBankService {
2
3      private DatabaseConnection connection = null;
4
5      public void performTransfer(String account, Long amount) throws Exception {
6          TransferOrm transfer = new TransferOrm();
7
8          transfer.setAccount(account);
9          transfer.setAmount(amount);
10
11         connection.save(transfer);
12     }
13
14     public void beginTransaction() throws Exception {
15         connection = new Connection();
16         connection.beginTransaction();
17     }
18
19     public void commitTransaction() throws Exception {
20         connection.commitTransaction();
21     }
22
23     public void rollbackTransaction() throws Exception {
24         connection.rollbackTransaction();
25     }
26
27 }
```

FIG. 6C

```
1  public class WebServiceBankService extends AbstractHttpBankService {
2
3      public void createAuthenticationHeaders() throws Exception {
4          client.setHeader("Authorization", "ericsheridan:ericsheridan");
5      }
6
7      public void performTransfer(String account, Long amount) throws Exception {
8          startConnection("/webservice.asmx");
9
10         try {
11             client.getParameters().put("account", account);
12             client.getParameters().put("amount", amount);
13
14             client.submit();
15         } finally {
16             shutdownConnection();
17         }
18     }
19
20 }
```

FIG. 6D

```
1  public abstract class AbstractHttpBankService extends AbstractBankService {
2
3      protected HttpClient client = null;
4
5      public void createAuthenticationHeaders() throws Exception {
6              // default anonymous
7      }
8
9      public void startConnection(String address) throws Exception {
10             client = new HttpClient();
11
12             client.setAddress(address);
13             createAuthenticationHeaders();
14
15             client.connect();
16     }
17
18     public void shutdownConnection() throws Exception {
19             client.shutdown();
20     }
21
22 }
```

FIG. 6E

```
1  public interface IBankService {
2
3      public void transfer(String account, Long amount) throws Exception;
4
5  }
```

FIG. 6F

```
1   public class FirstFilter implements Filter {
2
3       public void init(FilterConfig config) {
4           /** nothing to do **/
5       }
6
7       public void doFilter(ServletRequest request, ServletResponse response,
        FilterChain chain) {
8           chain.doFilter(request, response);
9       }
10
11      public void destroy() {
12          /** nothing to do **/
13      }
14
15  }
```

FIG. 7A

```
1   public class SecondFilter implements Filter {
2
3       public void init(FilterConfig config) {
4           /** nothing to do **/
5       }
6
7       public void doFilter(ServletRequest request, ServletResponse response,
        FilterChain chain) {
8           chain.doFilter(request, response);
9       }
10
11      public void destroy() {
12          /** nothing to do **/
13      }
14
15  }
```

FIG. 7B

TECHNIQUES FOR TRAVERSING REPRESENTATIONS OF SOURCE CODE

CROSS-REFERENCE TO RELATED APPLICATIONS

This application is a continuation of U.S. patent application Ser. No. 13/830,510, entitled "TECHNIQUES FOR TRAVERSING REPRESENTATIONS OF SOURCE CODE", filed on Mar. 14, 2013, which is hereby expressly incorporated herein by reference in its entirety.

BACKGROUND

Embodiments of the present invention relate to software testing and in particular static code analysis.

In static code analysis, a software application is tested without actually executing the application. The software application is typically tested by processing and analyzing the source code of the application prior to compiling the code. The entire source code of the application, or only portions of the source code, may be analyzed. The source code may be analyzed for one or more of a variety of purposes, such as for identifying possible coding errors, determining properties (e.g., operational behaviors) of the software application, etc.

As software applications become larger and more complex, performing accurate, timely, and efficient static code analysis is becoming increasingly difficult. Typical static code analyzers traverse the source code of an application and, as they traverse, they run into control flows where a plurality of paths may be taken. To ensure a holistic test, the static code analyzers traverse all possible paths. While traversing all possible paths may ensure that every possible execution path is tested, it also results in significant inefficiencies as paths that could not actually be followed during runtime (i.e., impossible execution paths) are also tested. Further, various other problems also arise when performing static code analysis on source code that makes use of modern programming paradigms such as object oriented programming, inversion of control, dependency injection, and aspect oriented programming.

BRIEF SUMMARY

Embodiments of the present invention may address one of more of these deficiencies. In one embodiment, a method of traversing a representation of an application source code is disclosed. The method comprises beginning to traverse, using one or more computer processors, the representation of the application source code, monitoring a history of the traverse, and continuing to traverse the representation of the application source code based on the history of the traverse. Continuing to traverse the representation of the application source code may include identifying a plurality of concrete implementations of a method invocation and traversing less than all of the concrete implementations, the concrete implementations being traversed being selected based on the history of the traverse.

In at least one embodiment, the method further comprises selecting one of a plurality of entry points to the application source code, wherein beginning to traverse the representation of the application source code includes beginning at the selected entry point.

In some embodiments, monitoring a history of the traverse includes storing metadata associated with visited concrete implementations of method invocations. The metadata may include a reference to the class declarations enclosing the visited concrete implementations.

In at least one embodiment, the method further comprises determining whether a method invocation or its corresponding concrete implementation is marked with a runtime binding rule. When it is determined that the method invocation or its corresponding concrete implementation is marked with a runtime binding rule, a method declaration identified by the runtime binding rule is jumped to.

In other embodiments, a computer system is disclosed. The computer system comprises a storage element operable to store a representation of an application source code, and a processor operable to perform operations. The operations may include: beginning to traverse the representation of the application source code, monitoring a history of the traverse, and continuing to traverse the representation of the application source code based on the history of the traverse. Continuing to traverse the representation of the application source code may include identifying a plurality of concrete implementations of a method invocation and traversing less than all of the concrete implementations, the concrete implementations being traversed being selected based on the history of the traverse.

In yet other embodiments, a tangible non-transitory computer readable storage medium is disclosed. The storage medium has code stored thereon that, when executed by a computer, causes the computer to perform various operations. The operations may include: beginning to traverse the representation of the application source code, monitoring a history of the traverse, and continuing to traverse the representation of the application source code based on the history of the traverse. Continuing to traverse the representation of the application source code may include identifying a plurality of concrete implementations of a method invocation and traversing less than all of the concrete implementations, the concrete implementations being traversed being selected based on the history of the traverse.

Additional embodiments and features are set forth within the description that follows, and in part will become apparent to those skilled in the art upon examination of the specification, or may be learned by the practice of the disclosed embodiments. The features and advantages of the disclosed technology may be realized and attained by means of the instrumentalities, combinations, and methods described in the specification.

BRIEF DESCRIPTION OF THE FIGURES

FIG. 6A is an example code snippet of a web front end containing an entry point.

FIG. 6B is an example code snippet of an abstract class providing convenience methods.

FIG. 6C is an example code snippet of a bank service for database persistence.

FIG. 6D is an example code snippet of a bank service for web service persistence.

FIG. 6E is an example code snippet of an abstract class with http convenience methods.

FIG. 6F is an example code snippet of an interface for bank service implementations.

FIG. 7A is an example code snippet of a first J2EE filter to be invoked in a filter chain.

FIG. 7B is an example code snippet of a second J2EE filter to be invoked in a filter chain.

DETAILED DESCRIPTION

Figure 1:
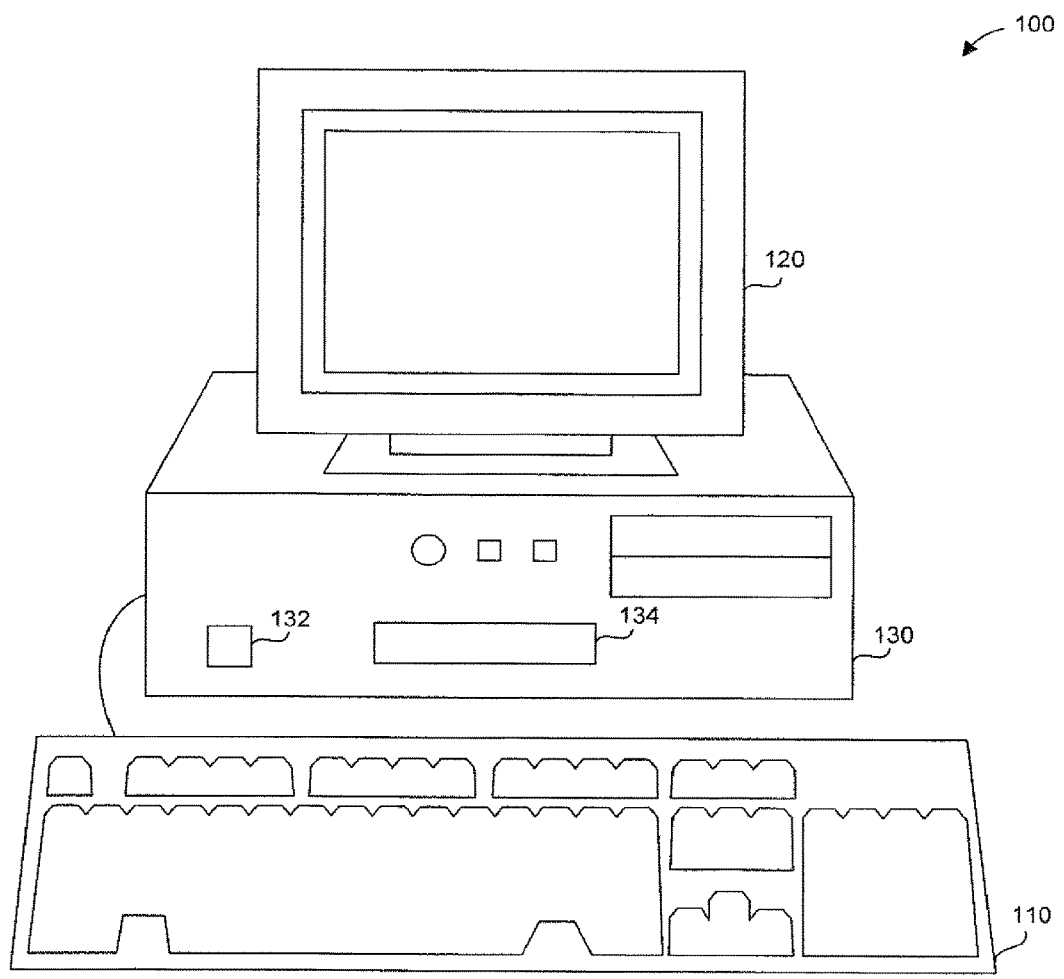
FIG. 1 is a block diagram illustrating a computer system according to embodiments of the present invention.

Embodiments of the present invention include apparatus, methods and systems for more efficiently and correctly traversing the static call graph of application source code. Some of the techniques described herein provide a static code analysis (SCA) engine that is more efficient and correct as it compensates for various modern application programming paradigms, including but not limited to: object oriented programming, inversion of control, dependency injection, and aspect oriented programming. Methods executed by the SCA engine may be described as "Runtime Simulation" as they may provide the ability to accurately model and traverse the call graph of an application as if the application were actually running.

The SCA engine begins analysis by identifying all of the entry points into the application. Entry points are those locations where execution of the source code begins from the perspective of the target codebase. For example, the "public static void main(java.lang.String[ ] args)" method would be considered an entry point for a Java code base. The SCA engine begins by leveraging the visitor pattern to traverse the method body of the current (i.e., entry point) method, collecting various metadata useful for security analysis (such as the fully qualified class name of the class that contains the method declaration that the engine is jumping to, a reference to the method invocation, etc.). Once the SCA engine hits a call-site (e.g., a method invocation), the SCA engine will "jump" to one or more concrete method declaration implementations of the associated method invocation (i.e., begin traversing the method body of the one or more concrete method declaration implementations). The SCA engine determines which potential concrete implementations to visit based on various metadata collected from previous visits. Such metadata allows the SCA engine to understand a) the current data type and b) the location in the inheritance stack of the current data type. Based on this information, the SCA engine can reduce the number of concrete implementations to visit and jump to only those declarations that could possibly be traversed if the application were actually running. This strategy may advantageously compensate for challenges associated with object-oriented programming and dependency injection. The same process may be applied to traverse the source code at each identified entry point.

The SCA engine may also include support for dealing with inversion of control through the use of code slicing. Rules captured in a separate file (e.g., XML markup, Java source code, etc.) or "Rule Pack" describe to the SCA engine how to properly perform code slicing for an application codebase. These rules may be referred to as "Runtime Binding Rules" ("RBR"). When the SCA engine is traversing a call graph and it encounters a matching runtime binding rule, the engine will augment the call graph traversal using code slicing techniques in accordance with the rule. Code slicing as implemented using Runtime Binding Rules allows the engine to simulate the inversion of control behavior that is actually carried out by the library and/or framework at runtime.

Runtime binding rules can be applied to both method invocations and method declarations in one or more of a variety of different situations. Prior to visiting any concrete implementations associated with a method invocation, the SCA engine may check to see if the method invocation is marked with a runtime binding rule. If so, the SCA engine will jump to those concrete implementations referenced by the rule instead of those concrete implementations that the SCA engine would otherwise visit.

Just before visiting a method body (i.e. concrete implementation), the engine may check to see if the method is marked with a "before" runtime binding rule. If so, the engine will jump to those concrete implementations referenced by the rule before visiting the current method's body (i.e. a method body can be marked indicating that one or more other method bodies must be traversed before visitation).

Just after visiting a method body (i.e. concrete implementation), the engine will check to see if the method body is marked with an "After" runtime binding rule. If so, the engine will jump to those concrete implementations referenced by the rule after already having visited the current method's body (i.e. a method body can be marked indicating that one or more other method bodies must be traversed after visitation).

Turning now to the figures, FIG. 1 is a block diagram illustrating a computer system 100 according to embodiments of the present invention. Computer system 100 may be any suitable electronic computing device, such as a desktop computer, a laptop computer, a network server, a note pad, a mobile phone, a personal digital assistant (PDA), a handheld or portable device (iPhone™, Blackberry™, etc.), or other electronic device. Computer system 100 may be associated with a user having a desire to perform static code analysis on source code stored at the computer system 100 or remote from computer system 100.

Computer system 100 may include any suitable components typically found in such a system necessary to perform the operations discussed herein. In one embodiment and as illustrated in FIG. 1, computer system 100 includes an input device 110, an output device 120, and a case 130, all coupled to one another.

The input device 110 may be any device suitable for receiving input from the user. In the embodiment depicted in FIG. 1, the input device 110 is a keyboard. However, in other embodiments, the input device 110 may include a mouse, a pointer, a touch-screen, a microphone, or other device suitable to receive information from a user.

The output device 120 may be any device suitable for providing information to the user. In the embodiment depicted in FIG. 1, the output device 120 is an electronic display (e.g., a liquid crystal display, a light emitting diode display, etc.). However, in other embodiments, the output device 120 may include a speaker or other device suitable for providing information to the user. In at least one embodiment, the input device 110 and the output device 120 may be integrated with one another.

The case 130 may be any suitable case for containing one or more additional elements of computer system 100, such as one or more processors 132, one or more storage elements 134, etc. The processor 132 may be any suitable computer processor operable to execute instructions stored on a medium (e.g., code representing the SCA engine), and storage element 134 may be any suitable tangible non-transitory computer readable storage medium. The storage element 134 may be operable to store application source code to be tested, representations of the source code under test, an application representing the SCA engine, etc. The storage element 134 may include, for example, one or more of random access memory (RAM), read only memory (ROM), electrically-erasable programmable read only memory (EEPROM), a hard disk, an optical disk, etc. The processor 132 may be operable to execute the application representing the SCA engine so as to test the source code under test.

In some embodiments, the application source code may be stored remotely from the computer system 100. In such cases, the application source code, in whole or in part, may be retrieved by the computer system 100 and tested by the computer system 100. For example, the computing system 100 may also include a communication interface (not shown) to facilitate wired or wireless communication with one or more other electronic devices, and may use the communication interface to acquire the source code and, in some embodiments, communicate test results.

Computer system 100 in certain embodiments is a computing environment for performing static code analysis using a number of components as depicted in FIG. 1. However, it will be appreciated by those of ordinary skill in the art that static code analysis as described herein could be performed equally well in other computing environments including computer systems having fewer or a greater number of components than are illustrated in FIG. 1. Thus, the depiction of computer system 100 in FIG. 1 should be taken as being illustrative in nature, and not limiting to the scope of the disclosure.

Figure 2:
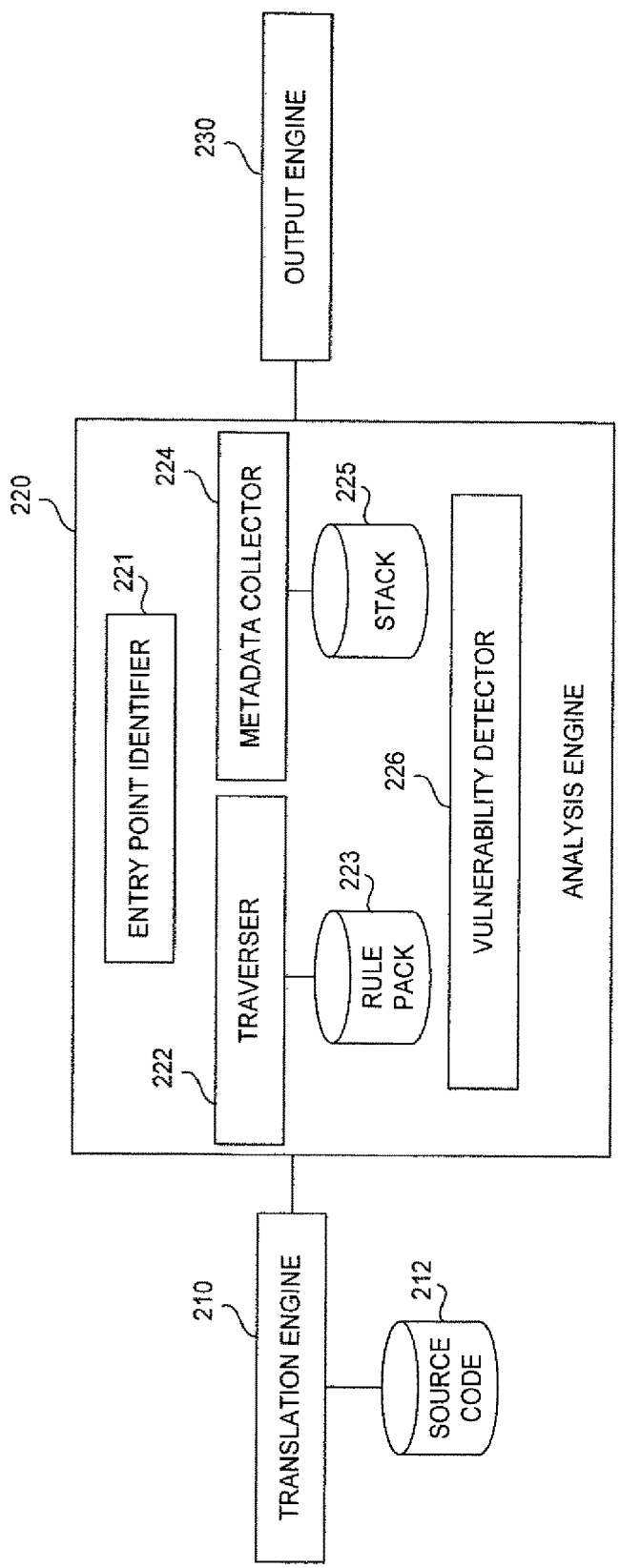
FIG. 2 illustrates various computing engines that may be used to perform static code analysis according to embodiments of the present invention.

FIG. 2 illustrates various computing engines that may be used to perform static code analysis according to embodiments of the present invention. The various engines may comprise code operable to perform various functions when executed by a processor, or may comprise hardware operable to perform various functions when activated. For example, the various engines may comprise code stored on storage element 134 (FIG. 1) that is operable to cause computer system 100 to perform various operations when executed by processor 132. In some embodiments, the various engines depicted herein may correspond to the previously described SCA engine.

A translation engine 210 is coupled to a source code depository 212. The source code depository 212 may store source code of an application under test, where the source code may represent all or only a portion of the application under test. For example, the source code depository 212 could be located in storage element 134 (FIG. 1). The translation engine may read the source code from source code depository 212 and generate a representation of the source code. For example, the translation engine may generate a representation of the abstract syntactic structure of the source code. In at least one embodiment, the translation engine may generate an abstract syntax tree (AST) of the source code.

An analysis engine 220 is coupled to the translation engine 210 and is operable to receive the representation of the source code from the translation engine 210. The analysis engine is operable to perform static code analysis on the representation of the source code. The analysis engine 220 may include one or more of a variety of components, such as an entry point identifier 221, a traverser 222 coupled to a rule pack 223, a metadata collector 224 coupled to a stack 225, and a vulnerability detector 226.

The entry point identifier 221 may be operable to identify the entry points of the source code and, in some embodiments, select one or more of those entry points for subsequent traversing. The traverser 222 may be operable to traverse the representation of the source code as described herein. In traversing the representation of the source code, the traverser 222 may use one or more rules included in one or more rule packs 223. Further, the traverser 222 may use metadata provided from metadata collector 224 and, for example, stored in stack 225. In some embodiments, the traverser 222 may traverse the representation of the source code by independently beginning its traversal at each identified entry point.

Metadata collector 224 may be operable to collect metadata while the traverser 222 traverses the representation of the source code. Metadata collector 224 may collect information such as class names, fully qualified class names, references to method invocations, etc. The metadata collector 224 may also be operable to push and pull metadata to the stack 225. The metadata may be pushed and pulled from the stack 225 at suitable times determined by the traverser 222 and further described herein.

The vulnerability detector 226 may be operable to detect or otherwise identify vulnerabilities in the source code. Vulnerabilities may include bugs, security breaches, violations of programming conventions, etc. The vulnerability detector 226 may detect vulnerabilities while the traverser 222 traverses the representation of the source code as further described herein.

Output engine 230 may be operable to generate and output information to the user. The output engine 230 may be coupled to the analysis engine 220 to receive results from components of the analysis engine 220 such as the entry point identifier 221, traverser 222, metadata collector 224, and vulnerability detector 226. For example, output engine 230 may receive indications of vulnerabilities detected by vulnerability detector 226 and output those indications to the user.

The engines depicted in FIG. 2 are operable to perform static code analysis according to certain embodiments. However, it will be appreciated by those of ordinary skill in the art that static code analysis as described herein could be performed equally well using fewer or a greater number of computing engines than are illustrated in FIG. 2. Thus, the depiction of computing engines in FIG. 2 should be taken as being illustrative in nature, and not limiting to the scope of the disclosure.

Figure 3:
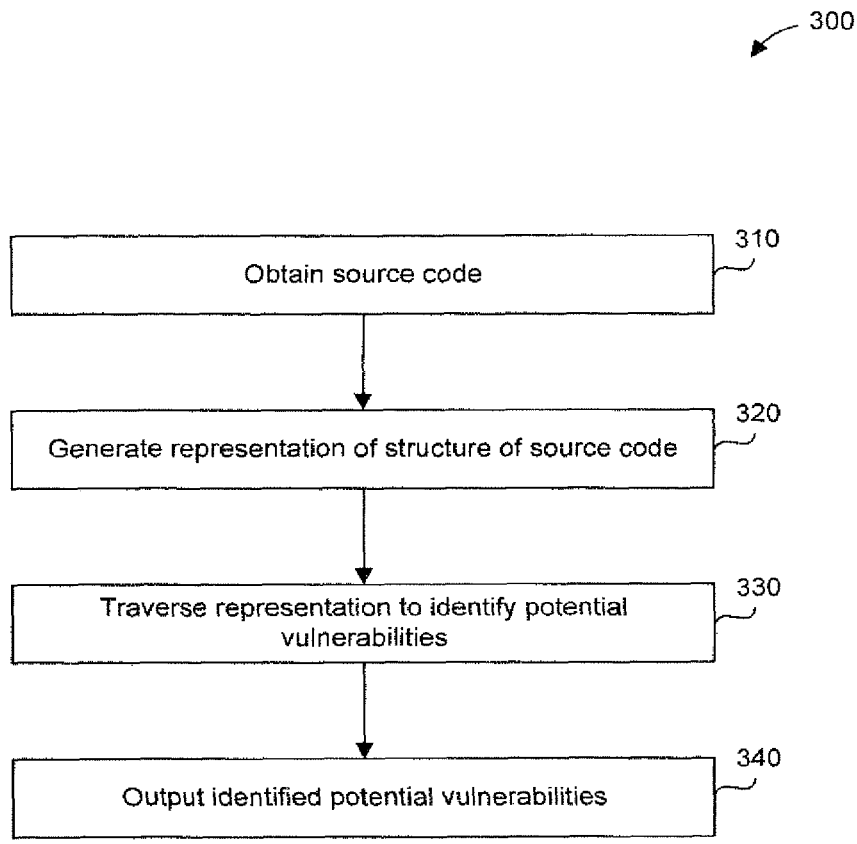
FIG. 3 is a flowchart showing a method of performing static code analysis according to embodiments of the present invention.

FIG. 3 is a flowchart showing a method 300 of performing static code analysis according to embodiments of the present invention. The method 300 may be executed by any suitable computing system, such as computing system 100 (FIG. 1), and/or one or more computational engines including those described with reference to FIG. 2.

In operation 310, the source code is obtained. The entire source code or only portions of the source code of an application to be tested may be acquired. For example, computing system 100 may receive the source code from another electronic device via wired or wireless communications. For another example, the source code may be generated at computing system 100. The source code may be stored at computing system 100, e.g., by storage element 134, and/or by source code repository 212 (FIG. 2).

In operation 320, a representation of the structure of the source code is generated. For example, translation engine 210 (FIG. 2) may generate an AST of the source code, where the AST includes various nodes to be traversed.

In operation 330, the representation of the structure of the source code is traversed to identify potential vulnerabilities. For example, the nodes of the AST may be traversed using traverser 222 (FIG. 2). The AST may be traversed efficiently so as to avoid or reduce the number of control paths traversed which may not be actually followed during runtime. The AST may also be traversed by starting at one or more identified entry points. While the AST is traversed, potential vulnerabilities may be detected. For example, vulnerability detector 226 (FIG. 2) may identify bugs, security breaches, violations of programming conventions, etc. Once the AST is traversed from one entry point, the AST may then be traversed starting from other entry points, until all entry points have been used to traverse the AST, where the traversal at each entry point is performed from a new/fresh/clean state.

In operation 340, any identified potential vulnerabilities may be output. For example, output engine 230 (FIG. 2) may display the identified potential vulnerabilities to a user, store the identified vulnerabilities in a file for communication to the user, etc.

It should be appreciated that the specific operations illustrated in FIG. 3 provide a particular method of performing static code analysis according to certain embodiments of the present invention. Other sequences of operations may also be performed according to alternative embodiments. For example, alternative embodiments of the present invention may perform the operations outlined above in a different order. Moreover, the individual operations illustrated in FIG. 3 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 4:
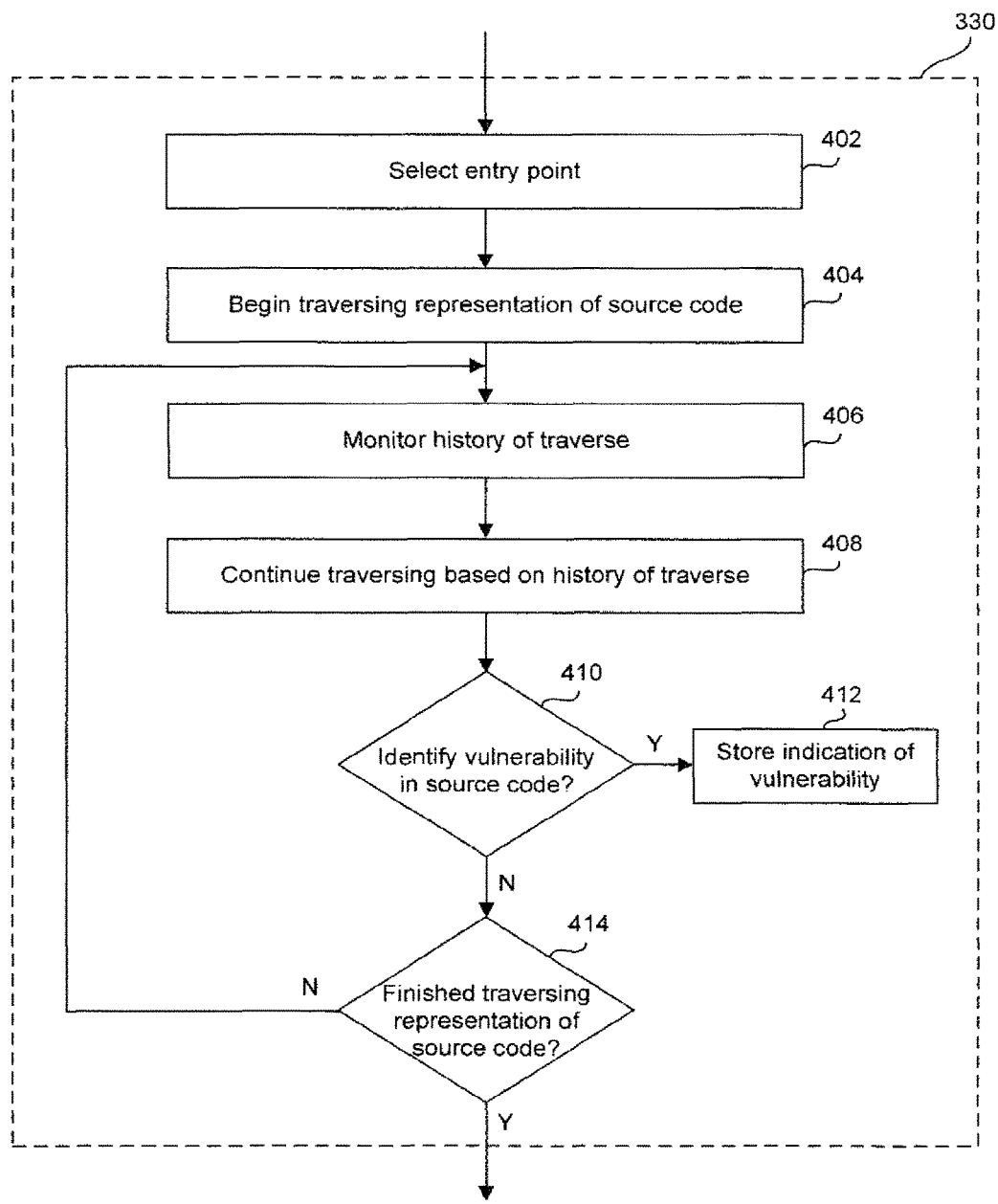
FIG. 4 is a flowchart showing operations for traversing a representation of source code as depicted in FIG. 3 according to a first embodiment of the present invention.

FIG. 4 is a flowchart showing operations for traversing a representation of source code 330 depicted in FIG. 3 according to a first embodiment of the present invention. The operations may be executed by any suitable computing system, such as computing system 100 (FIG. 1), and/or one or more computational engines including those described with reference to FIG. 2.

In operation 402, an entry point is selected. For example, the entry point identifier 221 (FIG. 2) may identify some or all of the entry points of the source code. One of the entry points may then be selected, and traversal of the representation of the source code may begin at the selected entry point. In at least one embodiment, each of the entry points may be selected in sequence, and the representation of the source code may be traversed beginning at each of the entry points. Further, the processes described herein may be uniquely applied to each entry point, so that, for example, states generated during the traversal from one entry point do not impact states generated during the traversal from another entry point.

In operation 404, traversal of the representation of source code begins. For example, traverser 222 (FIG. 2) may begin traversing the representation of source code generated by translation engine 210 at one of the identified entry points. In at least one embodiment, the representation of source code may be traversed using a visitor pattern.

In operation 406, the traversal history is monitored. For example, the history of the traverser 222 traversing the representation of source code may be monitored and stored. This may include storing metadata associated with visited concrete implementations of method invocations. For example, metadata collector 224 (FIG. 2) may collect and store metadata in stack 225 so to form a history of the traverse. Metadata may include the class name of the class that includes the visited concrete implementations of method invocations, or other suitable information for identifying a scanning path.

In operation 408, the traversal of the source code is continued based on the history of the traverse. For example, while traversing a method body, traverser 222 may run into a method invocation and identify a plurality of concrete implementations of the method invocation. Instead of traversing all concrete implementations, the traverser 222 may use metadata collected in stack 225 to select and traverse less than all of the concrete implementations. In one embodiment, the traverser 222 selects and traverses only one of the identified concrete implementations.

In operation 410, it is determined whether a vulnerability in the source code is identified. For example, vulnerability detector 226 may identify a vulnerability in the source code. If a vulnerability is detected, processing may continue with operation 412 where an indication of the vulnerability is stored. If a vulnerability is not detected, then processing may continue to operation 414 where it may be determined whether traversal of the representation of source code is finished. For example, the traverser 222 may determine whether it has finished traversing the representation of source code. If traversing is finished, then processing may continue to operation 340 (FIG. 3), where the stored indications of potential vulnerabilities are output to the user. Otherwise, processing may return to operation 406.

It should be appreciated that the specific operations illustrated in FIG. 4 provide a particular method of traversing a representation of source code according to certain embodiments of the present invention. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 5A:
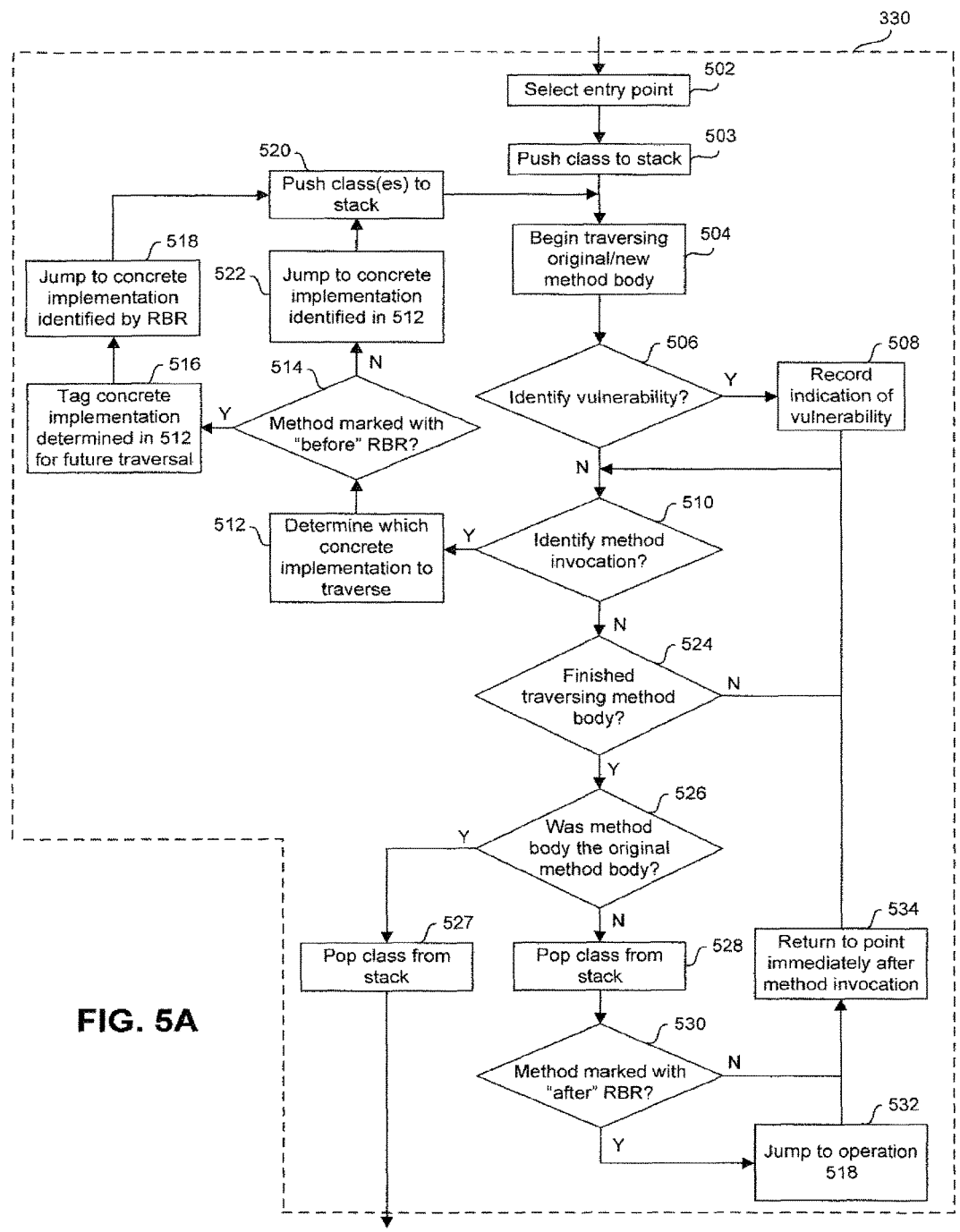
FIG. 5A depicts a flowchart showing operations for traversing a representation of source code as depicted in FIG. 3 according to a second embodiment of the present invention.

FIG. 5A depicts a flowchart showing operations for traversing a representation of source code (e.g., source code 330 depicted in FIG. 3) according to a second embodiment of the present invention. The operations may be executed by any suitable computing system, such as computing system 100 (FIG. 1), and/or one or more computational engines including such as those described with reference to FIG. 2.

In operation 502, an entry point is selected similar to operation 402 (FIG. 4), thus further description is omitted. Once an entry point to a method body is identified, processing may then continue to operation 503 where metadata associated with the method body is stored (e.g., pushed to stack 225). In one particular embodiment, metadata collector 224 may push the acquired metadata to the stack 225 so to form a history of the traverse. For example, the metadata collector 224 may push a reference to the class declaration including the class name encompassing the method body to the stack 225. Once such metadata is pushed to the stack, processing may continue to operation 504. In operation 504, the traverser 222 begins traversing the method body. As traversal at this point began immediately after selecting an entry point, the traverser 222 begins traversing the original method body (i.e., the method body identified by the entry point).

While traversing the method body, the source code is analyzed for potential vulnerabilities. Thus in operation 506 the vulnerability detector 226 determines whether any potential vulnerabilities are identified. If so, then processing continues to operation 508 where an indication of the potential vulnerability is stored. For example, information identifying the type of potential vulnerability, where the potential vulnerability is, how to access the potential vulnerability, a severity of the potential vulnerability, etc. may be stored in storage element 134. Once such information is stored, or in the event the vulnerability detector 226 does not identify any potential vulnerabilities, processing may continue to operation 510.

In operation 510, it is determined whether a method invocation is identified in the method body. For example, the traverser 222 may sequentially scan through the source code (or the representation of the source code) searching for method invocations in the source code. Upon identifying a method invocation in the method body, processing may continue to operation 512.

In operation 512, it is determined which concrete implementation to visit. For example, the traverser 222 may determine which concrete implementations of the method invocation identified in operation 510 should be subsequently traversed. In some cases, there may be only one concrete implementation of the method invocation (i.e., only one method declaration), and thus such concrete implementation may be determined. In other cases there may be more than one concrete implementation of the method invocation. In such cases one, some, or all of the concrete implementations may be determined. Such concrete implementation(s) are determined or otherwise identified for subsequent traversing. When multiple concrete implementations are determined, they may each be subsequently traversed. For example, while the first concrete implementation is traversed, the remaining concrete implementations may be queued for subsequent traversal. One specific embodiment for determining which concrete implementation(s) to visit is described with reference to FIG. 5B.

Once a concrete implementation is identified, processing may continue to operation 514. In operation 514 it is determined whether the method associated with the concrete implementation determined in operation 512 is marked with a "before" runtime binding rule. For example, the traverser 222 may access one or more runtime binding rules included in the rule pack 223 and determine whether any of the runtime binding rules apply to the concrete implementation determined in operation 512. If so, then one or more concrete implementations referenced by the runtime binding rule may be traversed first. Otherwise, the traverser 222 may jump straight to the concrete implementation identified in operation 512.

In at least one embodiment, the analysis engine may maintain a global lookup table that associates properties (e.g., associations with runtime binding rules) to objects (e.g., method implementations). When the analysis engine reads in the rule pack and has the representation of the source code, before it traverses the representation, it may apply the rule pack to the representation of the source code, using the results to populate the global lookup table.

Accordingly, if it is determined that the method associated with the concrete implementation determined in operation 512 is marked with a "before" runtime binding rule, then processing may continue to operation 516. In operation 516 the concrete implementation(s) determined in operation 512 may be tagged for future traversal. Such concrete implementation(s) may thus be traversed by, e.g., traverser 222 only after the concrete implementation identified by the "before" runtime binding rule are traversed.

After operation 516, processing may continue to operation 518 where the concrete implementation identified by the "before" runtime binding rule is jumped to. For example, the traverser 222 may jump to the concrete implementation referenced by the "before" runtime binding rule for subsequent traversal. In cases where the "before" runtime binding rule references a number of different concrete implementations, they may each be subsequently traversed. For example, while the first concrete implementation is traversed, the remaining concrete implementations may be queued for subsequent traversal.

Processing may then continue to operation 520 where the class(es) are pushed to a stack. For example, after jumping to the concrete implementation identified by the "before" runtime binding rule, the metadata collector 224 may acquire metadata of the identified concrete implementation (e.g., the class name of the concrete implementation). In one particular embodiment, metadata collector 224 may push the acquired metadata to the stack 225 so to form a history of the traverse. The stack may be time-ordered such that more recently pushed information may take priority over less recently pushed information. The most recently pushed information may also be popped off of the stack before the less recently pushed information. Once such metadata is pushed to the stack, processing may continue to operation 504 where the traverser 222 begins to traverse the new method body (i.e., the method body identified by the "before" runtime binding rule). The various operations described for the original method body may then be repeated for the new method body.

Returning to operation 514, if it is determined that the method associated with the concrete implementation determined in operation 512 is not marked with a "before" runtime binding rule, then processing may continue to operation 522. In operation 522 the traverser 222 may jump to the concrete implementation identified in operation 512. The metadata associated with the concrete implementation identified in operation 512 may then, in operation 520, be pushed to the stack 225. Once such metadata is pushed to the stack, processing may continue to operation 504 where the traverser 222 begins to traverse the new method body (i.e., the method body identified in operation 512). The various operations described for the original method body may then be repeated for the new method body.

Returning to operation 510, it may be determined that no further method invocations are identified in the method body. In such a case, processing may continue to operation 524. In operation 524 it is determined whether the current method body has been fully traversed. For example, the traverser 222 may determine whether there is any of the original or new method body that has not yet been traversed. If the current method body has not been fully traversed, then processing may return to operation 510 to determine whether there are any further method invocations in the current method body that need to be identified. Otherwise, processing may continue to operation 526.

In operation 526 it is determined whether the method body which was just finished being traversed is the original method body. If so, then the traverser 222 may be finished traversing the representation of the structure of the source code. Processing may then continue to operation 527 where the class name or other metadata for the original method body is popped off of the stack. If not, then this indicates that the traverser 222 finished traversing a 'new' method body and needs to return to the original method body to complete traversing of the original method body. Accordingly, processing may continue to operation 528.

In operation 528, a class name (or other metadata) is popped from or otherwise removed from the stack (or from the history of the traverse). As previously described the stack may be time-ordered such that more recently pushed information may take priority over less recently pushed information. The most recently pushed information may then be popped off of the stack before the less recently pushed information. In this particular example, it is the metadata associated with the method body which the traverser 222 just finished traversing that will be popped off of the stack. Processing may then continue to operation 530.

In operation 530 it may be determined whether the method is marked with an "after" runtime binding rule. For example, as described with reference to operation 514, the traverser 222 may access one or more runtime binding rules included in the rule pack 223 and determine whether any of the runtime binding rules apply to the concrete implementation which the traverser 222 just finished traversing. If so, then the traverser 222 may traverse the one or more concrete implementations referenced by the runtime binding rule prior to returning to the method invocation associated with the concrete implementation that the traverser 222 just finished traversing. That is, processing may continue to operation 532 where the traverser 222 jumps to operation 518, this time jumping to the concrete implementation(s) identified by the "after" runtime binding rules.

After any concrete implementation(s) identified by the "after" runtime binding rules have been traversed, or the method that was traversed in operation 530 is not marked with an "after" runtime binding rule, then processing may continue to operation 534. In operation 534 the traverser 222 returns to a point in the source code immediately after the method invocation associated with the concrete implementation that was just traversed. Processing may then return to operation 510 where the traverser 222 determines whether there are any further method invocations to be identified.

For example, during traversal of a first ("original") method body, the name of the class including the original method body may be pushed to the stack in operation 503 as the analysis engine beings traversing the original method body. As the analysis engine traverses the original method body, the analysis engine may identify a method invocation in operation 510. The method invocation may be associated with a particular concrete implementation that is determined in operation 512. The analysis engine may then jump to that concrete implementation in operation 522 and push the name of the class including the method body of the jumped-to concrete implementation to the stack as the analysis engine begins to traverse this "new" method body. The class name at the top of the stack is thus indicative of the name of the class for the method body currently being traversed.

As the analysis engine then traverses the "new" method body, it may not identify any method invocations in the new method body. Processing would thus continue to operation 524 where it determines that it finished traversing the method body, but the method body was not the "original" method body. Thus, processing would continue to operation 528 where the class name of the class including the method body that just finished being traversed is popped off of the stack. After that, processing may then continue to operation 534 where the analysis engine returns to a point in the original method body immediately after the method invocation that caused the analysis engine to traverse the "new" method body. The analysis engine may then continue traversing the original method body looking for additional method invocations. If none are found, then processing may continue to operation 526 where the analysis engine determines that is finished traversing the original method body, after which the class name of the original method body may be popped off of the stack in operation 527.

Figure 5B:
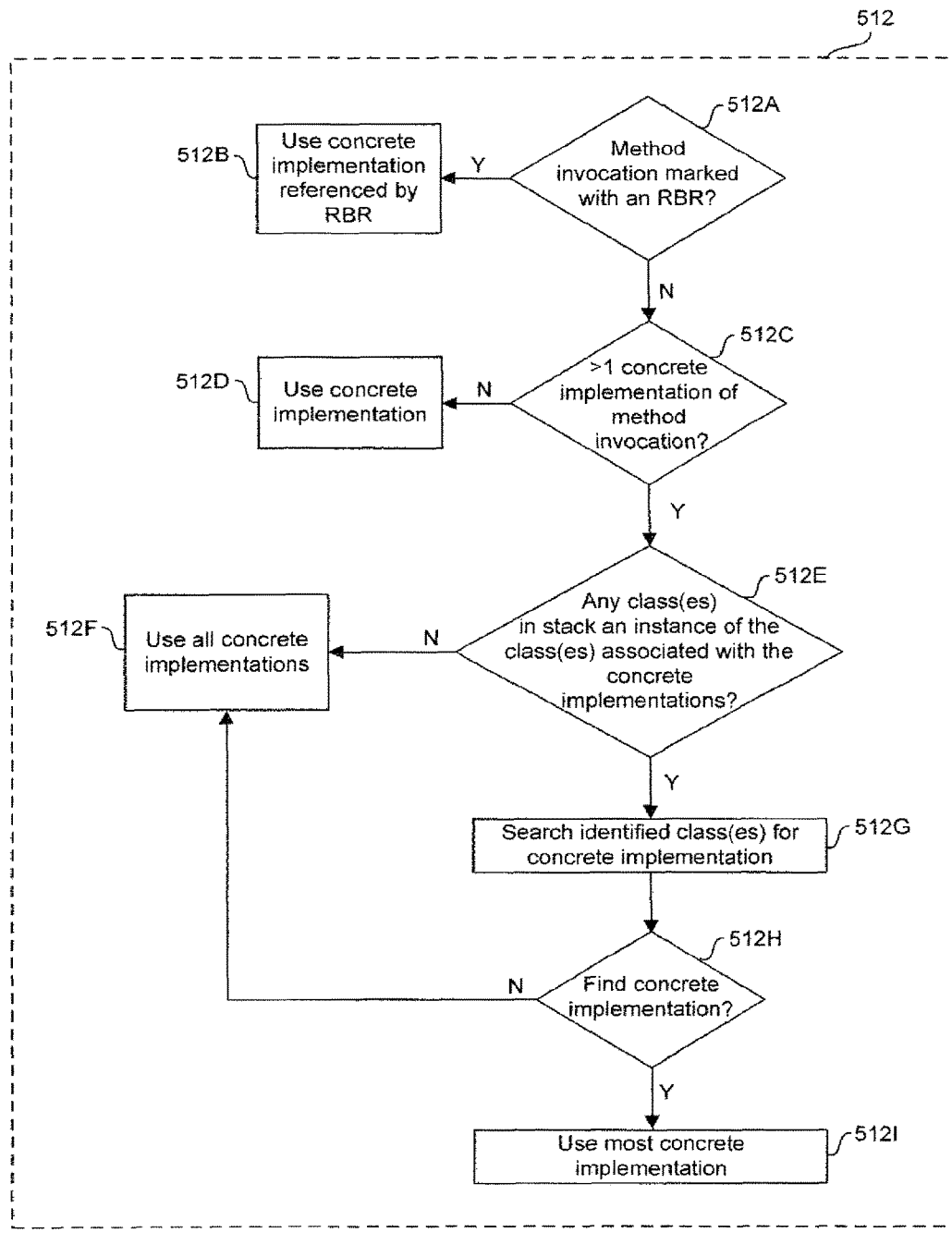
FIG. 5B depicts a flowchart showing operations for determining which concrete implementation to visit according to an embodiment of the present invention.

Turning now to FIG. 5B, a particular process for performing operation 512 in accordance with an embodiment is described. That is, a particular process for determining which concrete implementation to traverse is described. In operation 512A, it is determined whether the method invocation is marked with a runtime binding rule. For example, similar to the use of "before" and "after" runtime binding rules, the traverser 222 may determine whether the method invocation (in contrast to the method declarations for which runtime binding rules were previously described) is marked with a runtime binding rule. If so, then processing may continue to operation 512B where the concrete implementation referenced by the runtime binding rule is determined as the concrete implementation to traverse. In cases where the runtime binding rule references a number of different concrete implementations, they may each be subsequently traversed. For example, while the first concrete implementation is traversed, the remaining concrete implementations may be queued for subsequent traversal.

If, on the other hand, it is determined in operation 512A that the method invocation is not marked with a runtime binding rule, then processing may continue to operation 512C. In operation 512C it is determined whether there is more than one concrete implementation of the method invocation. In at least one embodiment, before beginning to traverse the representation of the source code, the analysis engine may collect metadata regarding each node of the representation and assign it to each node. For example, a list of method declarations that correspond to a method invocation may be stored in a table. The table may then be referenced during scanning of the representation of the source code to determine whether there are any concrete implementations of the method invocation.

If there is not more than one concrete implementation, then processing continues to operation 512D, where the analysis engine uses the one identified concrete implementation as the concrete implementation to traverse. If, however, there is more than one concrete implementation, then processing continues to 512E.

In operation 512E, it is determined whether any classes in the stack are an instance of the class(es) associated with the concrete implementations. If it is determined that none of the classes in the stack are an instance of the class(es) associated with the concrete implementations, then processing may continue to operation 512F where the analysis engine uses all concrete implementations as those to traverse. In jumping to all concrete implementations, the analysis engine 220 may jump to and traverse each concrete implementation sequentially. Otherwise, if it is determined that at least one of the classes in the stack are an instance of the class(es)

associated with the concrete implementations, then processing may continue to operation 512G.

In operation 512G, the identified classes are searched for the concrete implementation. For example, the analysis engine 222 may search the identified classes in the stack for the concrete implementation of the method invocation identified in operation 510. The analysis engine 222 may search the identified classes in any suitable order. In one particular embodiment, the analysis engine 222 begins searching the identified classes starting with the sub-most class on the stack; that is, the earliest-pushed class on the stack, in contrast to the most-recently pushed class.

In operation 512H, it is determined whether a concrete implementation of the method invocation identified in operation 510 is found in the identified classes. If no concrete implementation is found, then processing continues to operation 512F, where the analysis engine 220 uses all concrete implementations. Otherwise, processing continues to operation 512I, where the analysis engine 220 jumps to the concrete implementation in the identified class. In one particular embodiment, the concrete implementation used will be the most concrete (i.e., the earliest-pushed or sub-most class on the stack that includes the concrete implementation).

It should be appreciated that the specific operations illustrated in FIGS. 5A and 5B provide a particular method of traversing a representation of source code according to certain embodiments of the present invention. Other sequences of operations may also be performed according to alternative embodiments. For example, alternative embodiments of the present invention may perform the operations outlined above in a different order. Moreover, the individual operations illustrated in FIGS. 5A and 5B may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Walkthrough #1: Inheritance and Dependency Injection

The following section provides specific examples illustrating how the engine may start scanning source code, collect metadata along the way (including inheritance stack), and decide what concrete method declarations implementations to visit in the event the SCA engine hits, scans, or otherwise identifies a method invocation, according to various embodiments. This provides insight into how the engine may deal with complications such as inheritance and dependency injection (largely one in the same from the perspective of the scanner). Source code referenced by the following sections is captured in external ".java" files. In an attempt to remain concise, the walkthrough focuses on a limited number of method invocations to method declaration permutations in the source code. However, one skilled in the art would recognize that embodiments are not so limited, and that in at least one embodiment the engine may apply the following logic to all method invocations that have one or more corresponding method declarations.

Code References:
BankHttpServlet.java—web front end containing an entry point (FIG. 6A)
AbstractBankService.java—abstract class providing convenience methods (FIG. 6B)
DatabaseBankService.java—bank service for database persistence (FIG. 6C)
WebServiceBankService.java—bank service for web service persistence (FIG. 6D)
AbstractHttpBankService.java—abstract class with http convenience methods (FIG. 6E)
IBankService.java—interface for bank service implementations (FIG. 6F)

Step 1—Traverse Abstract Syntax Tree Starting at Entry Point(s)

The BankHttpServlet class (FIG. 6A) is responsible for responding to HTTP POST requests produced by clients such as browsers. Dependency injection (provided by a framework such as Spring) is leveraged to dynamically instantiate the bankService field at runtime (line 4). The SCA engine first translates this code into an Abstract Syntax Tree (AST) and searches for all of the "entry points". The above code contains one entry point: the doPost method (line 6). The engine starts traversing the AST node-by-node using the visitor pattern at this method declaration, consistently traversing the child nodes. The moment the engine visits a class, it pushes the class declaration onto an inheritance stack. The inheritance stack is responsible for maintaining a set of all the current qualified class names that the engine is currently in the process of visiting. Eventually, the engine encounters the method invocation bankService.transfer (line 11). At this point the engine must decide which concrete implementations (i.e., method declarations) of the aforementioned method invocation to jump to and start visiting.

At this point, the current inheritance stack includes:
1. BankHttpServlet

Step 2—Locate all Concrete Implementations of IBankService.Transfer

The engine identifies one concrete implementation to (i.e., method declaration for) the IBankService.transfer method (FIG. 6F) utilized by BankHttpServlet (FIG. 6A). The engine finds this concrete implementation in AbstractBankService.java (FIG. 6B). The engine then jumps to the method declaration at line 8 of AbstractBankService.java and begins visiting the method body. At this point the engine updates the inheritance stack to reflect the fact that it is now scanning a new class.

At this point, the current inheritance stack includes:
1. AbstractBankService
2. BankHttpServlet Step 3—Locate all Concrete Implementations of AbstractBankService.performTransfer Upon visiting the method body of AbstractBankService.transfer, the engine comes across the performTransfer(account, amount) method invocation (line 14). The engine will then locate all concrete implementations of this method resulting in two options: DatabaseBankService.java (FIG. 6C)(line 5), and WebServiceBankService (FIG. 6D) (line 7). At this point, the engine attempts to reduce the number of method declarations that are visited by inspecting the current inheritance stack. The engine inspects the stack to determine if there are any classes on the stack that are an instance of the classes associated with the target method declarations (i.e., DatabaseBankService and WebServiceBankService). The engine determines that there is a class on the stack (i.e., AbstractBankService) that, in this example, is an instance of the class associated with not one but both target method declarations. Once the engine collects all the classes that are an instance of the classes associated with the target method declarations, the engine looks for a method declaration that satisfies the method invocation (e.g., a method declaration that declares the AbstractBankService.performTransfer method and accepts two parameters) starting with the sub-most class. In this case, the engine determines that the AbstractBankService does not offer a concrete method declaration for the performTransfer method. As a result, the engine cannot rule out either target method declaration and thus visits both. For the sake of brevity, the remainder of this discussion will be focused on the traversal of the performTransfer method declaration in the WebServiceBankService class (line 7).

At this point, the current inheritance stack includes:
1. WebServiceBankService
2. AbstractBankService
3. BankHttpServlet Step 4—Traverse WebServiceBankService.performTransfer The engine begins to visit the method body of WebServiceBankService.performTransfer (FIG. 6)(line 7) and immediately hits the method invocation startConnection. This method invocation happens to have a concrete method declaration inherited by the super class AbstractHttpBankService (FIG. 6E)(line 9). Even though there is a concrete implementation of this method associated with the current class, the engine first inspects the inheritance stack for potential "override" candidates (those methods that may override startConnection and happen to be an instance of WebServiceBankService). Note that there is no class on the current inheritance stack that meets these criteria. At this point, the engine can safely visit the method declaration AbstractHttpBankService.startConnection. As usual, the engine updates the current inheritance stack accordingly.

At this point, the current inheritance stack includes:
1. AbstractHttpBankService
2. WebServiceBankService
3. AbstractBankService
4. BankHttpServlet Step 5—Traverse AbstractHttpBankService.startConnection The engine begins to visit the method body of AbstractHttpBankService.startConnection (FIG. 6E)(line 9) and eventually comes to the method invocation createAuthenticationHeaders. This method invocation happens to have a concrete method declaration in the same class (AbstractHttpBankService.createAuthenticationHeaders)(FIG. 6E)(line 5). Before the engine visits this method declaration, the engine first checks the current inheritance stack to determine if there are any more correct candidates. Looking at the inheritance stack, the engine determines that there are two classes that are an instance of (e.g., are equal to or extend; i.e., class A is an instance of class B if they have the same qualifying class name or if class A is the parent of class B) AbstractHttpBankService: AbstractHttpBankService and WebServiceBankService. Starting with the sub-most class (WebServiceBankService), the engine begins looking for any method that may override the createAuthenticationHeaders signature (e.g., override the createAuthenticationHeaders name and parameters). WebServiceBankService does in fact contain a method declaration matching the createAuthenticationHeaders. At this point the engine can safely rule out the implementation of this method in AbstractHttpBankService and instead only visit the implementation in WebServiceBankService. This illustrates the engines ability to: 1) reduce potential paths in code by inspecting the current inheritance stack that is very accurate given that the engine started at the application 'entry point', and 2) deal with object inheritance by properly jumping from sub classes to super classes and back. The inheritance stack is updated and the same logic is repeated:

At this point, the current inheritance stack includes:
1. WebServiceBankService
2. AbstractHttpBankService
3. WebServiceBankService
4. AbstractBankService
5. BankHttpServlet Walkthrough #2: Inversion of Control The following is an example illustrating how the SCA engine may compensate for inversion of control in applications through the use of code slicing techniques implemented as a runtime binding rule. Runtime binding rules may operate to stitch together disparate pieces of code allowing runtime simulation to properly continue throughout the application path.

Code References:

FirstFilter.java—first J2EE filter to be invoked in filter chain (FIG. 7A)

SecondFilter.java—second J2EE filter to be invoked in filter chain (FIG. 7B)

To illustrate the value of runtime binding rules to ensure runtime simulation is as accurate as possible, this example uses the concept of "Filters" in the Java Enterprise Edition (J2EE) platform. Filters implement an "interceptor pattern" in that they allow the developer to capture cross-cutting concerns in a centralized location and apply those concerns throughout the application. The J2EE server consumes the web.xml deployment descriptor which determines the ordering of filters in their chain of execution. For the sake of brevity, it is assumed that FirstFilter.java (FIG. 7A) is configured to execute first and SecondFilter.java (FIG. 7B) is configured to execute second. The method invocation in FirstFilter.java that instructs the J2EE server to invoke whatever happens to be the next filter in the chain (SecondFilter.java in this scenario) is chain.doFilter (request, response) (FIG. 7A)(line 8). At this point the J2EE server begins executing the doFilter method of the SecondFilter class (FIG. 7B)(line 7). A problem presented to the SCA engine is that there is no concrete method declaration associated with the chain.doFilter (FIG. 7A)(line 8) method invocation in the FirstFilter.java class. As a result, it does not know where to jump and thus results in significantly minimal call graph traversal.

To solve this problem, the engine consumes external knowledge bases captured in the form of "rule packs". Rule packs describe common application behaviors to the engine allowing it to produce more fruitful results. For example, all application entry points may be captured in a rule pack for engine consumption. Runtime binding rules are another form of rule in these rule pack. These rules allow the rule pack writer to signify that the engine should forcefully jump to a particular location in code if certain criteria are met. In this example, that criterion is the chain.doFilter method invocation in FirstFilter.java (FIG. 7A)(line 8). The runtime binding rule says "whenever the doFilter method is invoked on the chain object in FirstFilter.java, the engine should immediately jump to the doFilter method declaration in SecondFilter.java".

The following pseudo code illustrates the application of the runtime binding rule in this scenario:

```
var filters = collect_all_filters( )
for(filter1 : filters):
    for(filter2 : filters):
        if (filter1.is_mapped_to(filter2)):
            var do_filter_calls = find_do_filter_calls(filter1):
            var do_filter_decl = find_do_filter_decl(filter2):
            for(do_filter_call : do_filter_calls):
                runtime_bind(do_filter_call, do_filter_decl)
```

When the engine begins traversing the doFilter method body of FirstFilter, it will come across the chain.doFilter method invocation and notice it is marked with a runtime binding rule. When this is found, the engine forgoes its usual "check inheritance stack" logic previously described and instead will simply jump to the method declaration identified in the corresponding method declaration rule. In this case, the engine will not look for a method that implements doFilter(request, response, chain) and instead will just jump to the doFilter method declaration in SecondFilter (line 7).

Figure 8:
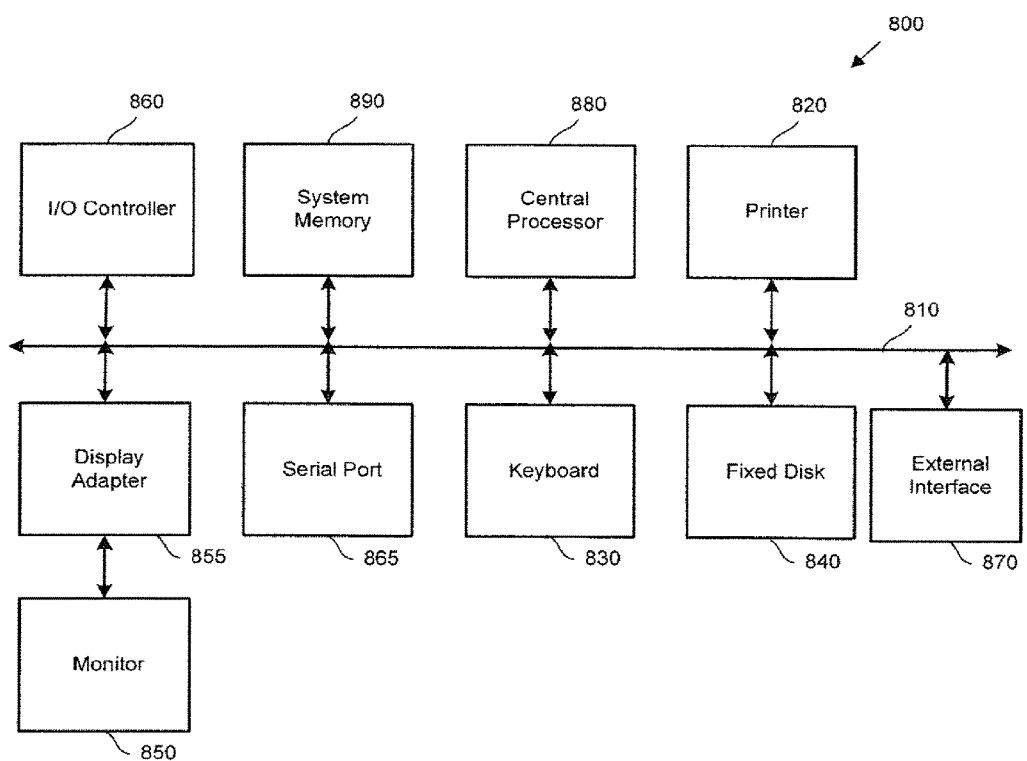
FIG. 8 is a diagram of a computer apparatus according to some embodiments.

FIG. 8 is a diagram of a computer apparatus 800 according to some embodiments. The various elements in the previously described embodiments (e.g., computer system 100) may use any suitable number of subsystems in the computer apparatus to facilitate the functions described herein. Examples of such subsystems or components are shown in FIG. 8. The subsystems shown in FIG. 8 are interconnected via a system bus 810. Additional subsystems such as a printer 820, keyboard 830, fixed disk 840 (or other memory comprising tangible, non-transitory computer-readable media), monitor 850, which is coupled to display adapter 855, and others are shown. Peripherals and input/output (I/O) devices (not shown), which couple to I/O controller 860, can be connected to the computer system by any number of means known in the art, such as serial port 865. For example, serial port 865 or external interface 870 can be used to connect the computer apparatus to a wide area network such as the Internet, a mouse input device, or a scanner. The interconnection via system bus 810 allows the central processor 880 to communicate with each subsystem and to control the execution of instructions from system memory 890 or the fixed disk 840, as well as the exchange of information between subsystems. The system memory 890 and/or the fixed disk 840 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method of traversing a representation of an application source code, the method comprising:

identifying, using at least one processor, a plurality of concrete implementations of a method invocation of the representation of the application source code;

selecting, based at least in part on a history of a traverse of the representation of the application source code, a set of concrete implementations from the plurality of concrete implementations of the method invocation, wherein each concrete implementation of the set of concrete implementations is associated with a location within the representation of the application source code;

traversing, one or more concrete implementations of the set of concrete implementations, where a concrete implementation of the one or more concrete implementations is visited before the method invocation when an associated location of the concrete implementation is before the method innovation and the concrete implementation is visited after the method invocation when the associated location is after the method innovation;

storing metadata, wherein the metadata comprises one or more class names associated with the one or more traversed concrete implementations;

identifying whether any of the one or more class names are an instances of at least one class which the concrete implementations are a part of;

searching the one or more identified classes for the concrete implementations of the method invocation;

traversing the one or more identified classes where the concrete implementation of the method invocation is found;
updating the history of the traverse; and
providing a set of identified vulnerabilities, the set of identified vulnerabilities based at least in part on the updated history of the traverse.

2. The method of claim 1, further comprising:
selecting one of a plurality of entry points to the representation of the application source code;
begin the traversing at the selected one of the plurality of entry points.

3. The method of claim 1, wherein the metadata includes a reference to one or more class declarations enclosing the one or more traversed concrete implementations.

4. The method of claim 1, further comprising:
in response to the determination that none of the one or more class names are an instance of at least one class which the concrete implementations are part of, all concrete implementations are traversed.

5. The method of claim 1, further comprising:
determining whether the method invocation or its corresponding concrete implementation has an associated runtime binding rule; and
when it is determined that the method invocation or its corresponding concrete implementation has an associated runtime binding rule, jumping to a method declaration specified by the runtime binding rule.

6. The method of claim 1, wherein each concrete implementation of the set of concrete implementations being traversed is selected from one or more of the plurality of concrete implementations based at least in part on a capability for the selected concrete implementation to occur if the application was running.

7. The method of claim 1, further comprising:
selecting, in an order specified by the representation of the application source code, one or more locations associated with the one or more concrete implementations within the representation of the application source code; and
applying one or more runtime binding rules associated with each selected location.

8. A system, comprising:
at least one storage device storing a representation of an application source code;
at least one processor; and
at least one memory storing instructions, which when executed by the at least one processor, cause the at least one processor to:
identify a plurality of concrete implementations of a method invocation of the representation of the application source code;
select, based at least in part on a history of a traverse of the representation of the application source code, a set of concrete implementations from the plurality of concrete implementations of the method invocation, wherein each concrete implementation of the set of concrete implementations is associated with a location within the representation of the application source code;
traverse, one or more concrete implementations of the set of concrete implementations, where a concrete implementation of the one or more concrete implementations is visited before the method invocation when an associated location of the concrete implementation is before the method innovation and the concrete implementation is visited after the method invocation when the associated location is after the method innovation;
store metadata, wherein the metadata comprises one or more class names associated with the one or more traversed concrete implementations;
identify whether any of the one or more class names are an instances of at least one class which the concrete implementations are a part of;
search the one or more identified classes for the concrete implementations of the method invocation;
traverse the one or more identified classes where the concrete implementation of the method invocation is found;
update the history of the traverse; and
provide a set of identified vulnerabilities, the set of identified vulnerabilities based at least in part on the updated history of the traverse.

9. The system of claim 8, further comprising instructions which when executed by the at least one processor, causes the processor to:
select one of a plurality of entry points to the representations of the application source code; and
begin the traverse at the selected one of the plurality of entry points.

10. The system of claim 8, wherein the metadata includes a reference to one or more class declarations enclosing the one or more concrete implementations.

11. The system of claim 8, further comprising instructions which when executed by the at least one processor, causes the processor to:
determine whether the method invocation or its corresponding concrete implementation is marked with a runtime binding rule; and
in response to the determination that the method invocation or its corresponding concrete implementation is marked with a runtime binding rule, jumping to a method declaration identified by the runtime binding rule.

12. The system of claim 8, further comprising instructions which when executed by the at least one processor, causes the processor to:
select, in an order specified by the representation of the application source code, one or more locations associated with the one or more concrete implementations within the representation of the application source code; and
apply one or more of the plurality of runtime binding rules associated with each selected location.

13. A non-transitory computer readable storage medium having instructions stored thereon that, when executed by at least one processor, causes the at least on processor to:
identify a plurality of concrete implementations of a method invocation of a representation of an application source code;
select, based at least in part on a history of a traverse of the representation of the application source code, a set of concrete implementations from the plurality of concrete implementations of the method invocation, wherein each concrete implementation of the set of concrete implementations is associated with a location within the representation of the application source code;
traverse, one or more concrete implementations of the set of concrete implementations, where a concrete implementation of the one or more concrete implementations is visited before the method invocation when an associated location of the concrete implementation is before the method innovation and the concrete implementation is visited after the method invocation when the associated location is after the method innovation;
store metadata, wherein the metadata comprises one or more class names associated with the one or more traversed concrete implementations;
identify whether any of the one or more class names are an instances of at least one class which the concrete implementations are a part of;
search the one or more identified classes for the concrete implementations of the method invocation;
traverse the one or more identified classes where the concrete implementation of the method invocation is found;
update the history of the traverse; and
provide a set of identified vulnerabilities, the set of identified vulnerabilities based at least in part on the updated history of the traverse.

14. The non-transitory computer readable storage medium of claim 13, further comprising instructions which when executed by the at least one processor, causes the processor to:
select one of a plurality of entry points to the representation of the application source code; and
begin at the selected one of the plurality of entry points.

15. The non-transitory computer readable storage medium of claim 13, wherein the metadata includes a reference to one or more class declarations enclosing the one or more concrete implementations.

16. The non-transitory computer readable storage medium of claim 13, further comprising instructions which when executed by the at least one processor, causes the processor to:
select, in an order specified by the representation of the application source code, one or more locations associated with the one or more concrete implementations within the representation of the application source code; and
apply one or more of the plurality of runtime binding rules associated with each selected location.

* * * * *